United States Patent [19]
Grill et al.

[11] Patent Number: 4,712,691
[45] Date of Patent: Dec. 15, 1987

[54] RACKING DEVICE

[76] Inventors: Hans Grill, Filswiesenstrasse 31, 7333 Ebersbach 1; Gerhard Tappen, Johann-Sebastian-Bach Str. 12, D732 Wangen, both of Fed. Rep. of Germany

[21] Appl. No.: 918,121

[22] Filed: Oct. 14, 1986

[51] Int. Cl.$^4$ ............................................. A47F 5/00
[52] U.S. Cl. ................................. 211/49.1; 211/150
[58] Field of Search ............ 211/150, 149, 59.4, 211/41, 49.1, 169.1, 170; 108/136, 152, 134; 414/902

[56] References Cited

U.S. PATENT DOCUMENTS

| | | | |
|---|---|---|---|
| 1,291,430 | 1/1919 | Davenport . | |
| 1,652,698 | 12/1927 | Boettger . | |
| 2,447,959 | 8/1948 | Phillips | 214/65 |
| 2,516,088 | 7/1950 | Einhorn | 211/41 |
| 2,531,543 | 11/1950 | Sutphen | 214/10.5 |
| 2,570,198 | 10/1951 | Brager | 198/25 |
| 2,953,253 | 9/1960 | Henderson | 211/41 |
| 3,151,576 | 10/1964 | Patterson | 108/2 |
| 3,161,158 | 12/1964 | Lurey | 108/2 |
| 3,813,005 | 5/1974 | Moe | 221/90 |
| 4,359,162 | 11/1982 | Mayer | 211/41 |
| 4,561,710 | 12/1985 | Boverman | 339/17 |
| 4,572,382 | 2/1986 | Niederprum | 211/150 |

FOREIGN PATENT DOCUMENTS

| | | |
|---|---|---|
| 1122000 | 1/1962 | Fed. Rep. of Germany . |
| 1233331 | 1/1967 | Fed. Rep. of Germany . |
| 2903053 | 2/1981 | Fed. Rep. of Germany . |

*Primary Examiner*—Robert W. Gibson, Jr.

[57] ABSTRACT

A device for stacking substantially planar finished parts, such as sheet metal panels, in a stacked vertical array. A plurality of latch columns are secured to a base member to define a space intermediate the columns for receiving the finished articles. Each latch column includes a plurality of latching arms having a receiving portion and a oppositely-directed, weighted arm structured so that each latch arm is capable of assuming a rest position, free from interference with said space, a receiving portion ready to receive said finished article thereon, and a loaded position. Pivoting of a latch arm upon loading from its receiving position to its loaded position causes a pivoting of the next uppermost latch arm from its rest position to its receiving position. Means are provided for locking said finished articles on said device. The locking device includes a locking plate having a plurality of extending fingers, pivotably movable from a unlocked position to a locking position to retain finished articles between said locking fingers and the receiving arm of corresponding latch arm.

19 Claims, 8 Drawing Figures

RACKING DEVICE

BACKGROUND OF THE INVENTION

This invention relates to a rack for sequentially stacking generally planar articles in non-contacting positions. More particularly, this invention relates to a storage rack having a plurality of counterweighted latch elements pivotally connected to a column and movable among a rest position, a receiving position, and a holding position for the articles. Still more particularly, this invention relates to a rack having a plurality of vertically spaced latching elements, each of which is movable from a rest position on a vertical column to a receiving position by the action of the next-adjacent lowermost latch as it is moved to its final holding position by the weight of the received articles and further including a manual or automatic locking cam arrangement activated to secure the stacked articles when the device is loaded for storage or transportation.

In mass production facilities and for material transportation, it is a continuing problem to store components and efficiently transport them from one location to another. Such a problem is particularly acute when the components are large, and substantially planar such as finished sheet metal parts made from steel or aluminum for the automotive industry, for example, after forming in panel presses. Thus, it is a problem in the art to produce a device suited for the storage and transportation of such parts such as outer body panels on a device which will receive and stack the parts one above the other with a gap between them to avoid damage to the component or to its finish.

Devices are known to the art for storing components of similar size and shape above each other and especially for storing sheets or sheet metal components within a frame or similar structure. In German Pat. No. 29 30 053, a device is shown in which movable double-ended lever arms are supported on horizontal supporting bolts. One arm of the lever arm acts as a control lever, while the other arm acts as a carrier. The lever arm receives a component in a way which causes its control arm to move the next higher lever arm from its rest position into a receiving position. In that device, the gravity-controlled rotation of the control arm overcomes the opposite rotational momentum of the carrier arm sufficiently to move each lever arm during lift-off of the loaded part caused by the heavier rotational momentum of the control arm from the work position into the receiving position and during subsequent lift-off of the next component from the receiving position into the rest position.

The device of that German patent is an improvement over the device shown in German Pat. No. 11 22 000 apparently used primarily for storing sheet metal in stacks on a device with levers with rotational axis located in horizontal elongated openings which permit their relocation by a spring action. In that device, a lever which is engaged by the weight of a sheet metal article acts against a spring loading the supporting arm to relocate the supporting arm to a receiving position.

Another device known for storing shipping containers is shown in German Pat. No. 12 33 331 which uses load arms held in a rest position by applying the weight of connecting rods to hold the opposite ends of the load arms in the desired position. Separate load and control levers are used, unduly complicating and multiplying the number of parts in the mechanism. Moreover, the control levers are connected with respective ends of the load arms by a complicated rod system requiring rectangular frame sections which are difficult to manufacture. Aside from its cost, the device is also quite noisy.

Accordingly, it is a continuing problem in the art to provide a simple, convenient racking device for a plurality of articles of similar size and shape, particularly where the articles are large and generally planar in construction, while paying attention to the need to avoid marring the surface or otherwise harming the part. It is desirable that the subsequent deposit of each finished part automatically move the next uppermost adjacent latch into a receiving position for the next part deposited on the device.

It is also desirable that the respective latches will return automatically to the rest position when a device is removed so that the racking device had complete flexibility for deposit or removal of finished parts.

Heretofore, such devices have not been provided with a locking mechanism for locking the parts on the device. Thus, some risk is encountered in moving the device from one location to another that the racking device, particularly at its uppermost portion, will become unstable, or the components will slip or slide from the rack. Thus, it is an objective of this device to provide at least one locking mechanism, which includes a locking cam on the uppermost portion of the latch column for locking the finished parts on the racking device. Preferably, the locking cams are returned manually to their originally unlocked position, but mechanized operation is also desirable in certain instances.

Thus, it is an overall object of this invention to provide a racking device for finished parts, such as sheet metal parts formed in pressed shape which will receive and stack the parts one above the other with a space between them.

It is an additional object of this invention to provide a racking device of the type described which includes the plurality of latches having a weighted arm and angularly disposed receiving arm pivotable about a point on a latch column so that the weight of a finished component rotates the latch from its receiving position to a loaded position, while causing the next uppermost latch to move from its rest position to a receiving position where it is ready for the deposit of the next finished article.

It is an additional overall object of this invention to provide a locking mechanism, including locking cams, for locking the plurality of stacked articles on the device into position during storage or transportation.

These and other objects of this invention will become apparent from a written description of the invention which follows, taken in conjunction with the accompanying drawings.

BRIEF SUMMARY OF THE INVENTION

Directed to achieving the foregoing objects and overcoming the problems in the art, the racking device according to the invention includes a base member having a plurality of latch columns disposed in an upright position in a spaced array on the base member for receiving a plurality of finished components in the space defined within the latch columns. Each latch column includes a plurality of vertically-spaced latch arms. Each of the latch arms is rotatable about a pivot to move from a rest position, which is free from the defined article-receiving space, to an article-receiving position and to a loaded position in sequence, depending upon the stacked state of the device. Each arm comprises a weighted portion spaced angularly opposite to the article-receiving portion. The lowermost arm on the rack is fixedly positioned in its article-receiving state to receive the first deposited article and to ready the next uppermost latch for the next article. When a finished component is deposited on the receiving arm of the latch arm, it is caused to pivot about the pivot pin so that the receiving arm assumes a horizontal attitude under the weight of the finished component. At the same time, the weighted arm pivots upwardly to contact the weighted arm of the next-adjacent uppermost latch arm to cause it to rotate from its rest position to its article-receiving position and thus arm the device for receiving the deposit of the next finished article.

This procedure continues in sequence until the racking device is loaded. A locking mechanism is provided at the uppermost portion of the latch column for manually or automatically locking the articles on the device for storage or transportation. Preferably, the locking device includes a locking plate having a plurality of locking fingers which interact with a stacked article to secure the article to the receiving arm. The locking mechanism includes a cam element and a connecting arm for pivoting the locking plate inwardly for locking and outwardly for unlocking either manually or automatically in response to actuation of the uppermost latch.

An alternative embodiment of the latch arm is also disclosed wherein the component receiving arm is bifurcated at its outermost end to define a recess therebetween. The latch arm is structured so that an article placed in the recess rests upon one portion of the bifurcated latch arm wherein, upon pivoting, the article is secured with the bifurcated recess.

These and other features of the invention will become apparent from a review of the detailed description of the invention which follows, taken in conjunction with the accompanying drawings.

DETAIL DESCRIPTION OF THE PREFERRED EMBODIMENT

Figure 1:
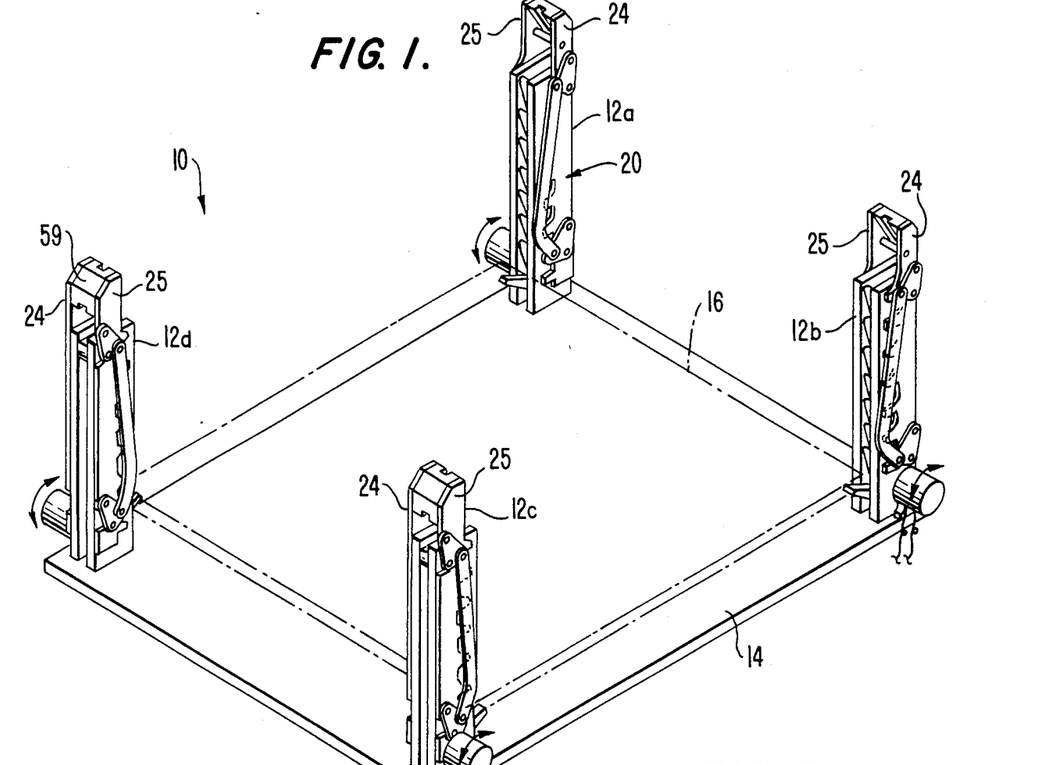
FIG. 1 is a perspective view of the racking device, according to the invention, showing a plurality of latch columns secured to a base member for receiving a plurality of finished components in a spaced, stacked array in the space defined within the latch columns.
Figure 2:
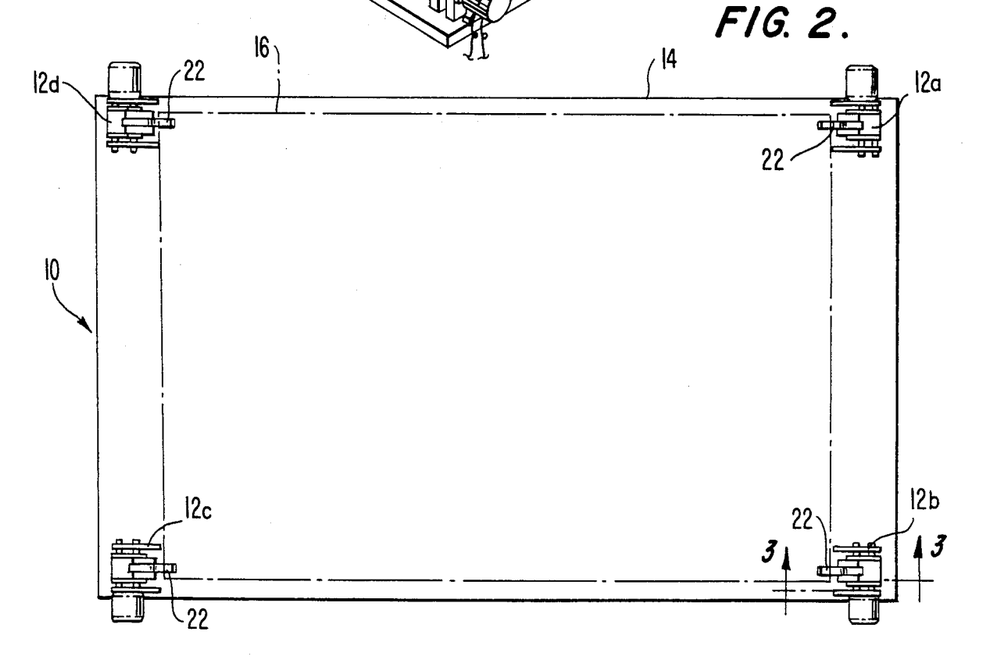
FIG. 2 is a top plan view of the racking device according to the invention.

In FIG. 1, a racking device according to the invention is designated generally by the reference numeral 10. The device includes a plurality of latch columns 12 secured to a base member 14 for receiving a plurality of substantially planar articles 16 as shown in phantom in FIG. 1 in the space defined intermediate the columns 12. The base member 14 is preferably a pallet, but may also be a portion of another transportable device such as a skid, the upper surface of a wheeled vehicle, or the like. The device 10 may thus be transported from among various locations in the work place, as needed, for receiving in the manufacturing process the plurality of stacked articles 16, moving them to another location, and readily unloading the articles 16 from the racking device 10.

Preferably, the stacked articles 16 are finished parts, and especially sheet metal parts, such as steel or aluminum parts for the automotive industry, made from forming in panel presses. However, the device 10 is suited for more delicate parts, such as outer car body panels, which the device 10 will receive and stack one above the other with a space between the stacked parts to avoid marring or otherwise damaging the surface of the parts or the parts themselves.

While four latch columns 12a, 12b, 12c, and 12d are shown in FIG. 1, a lesser or greater number of latch columns may be used. For example, three such latch columns, positioned corresponding to columns 12a-12c may be used for receiving articles relatively horizontally from a location otherwise occupied by the latch column 12d. As shown, the device 10 preferably receives articles sequentially from a stacking device (not shown), such as a robot, stacking crane, or the like, as a part of the material handling process in the work place from a position above the racking device 10. The positioning of the latch columns 12 depends upon the size and the shape of the finished part and may thus vary, such as to define an irregulr shape corresponding to an irregularly-shaped article.

Each of the latch columns is substantially identical and includes a locking device designated generally by the reference numeral 20. The locking device locks the finished parts 16 stacked on the latch columns 12 as will be discussed, after the positioning of the last or uppermost part 16.

Figure 3:
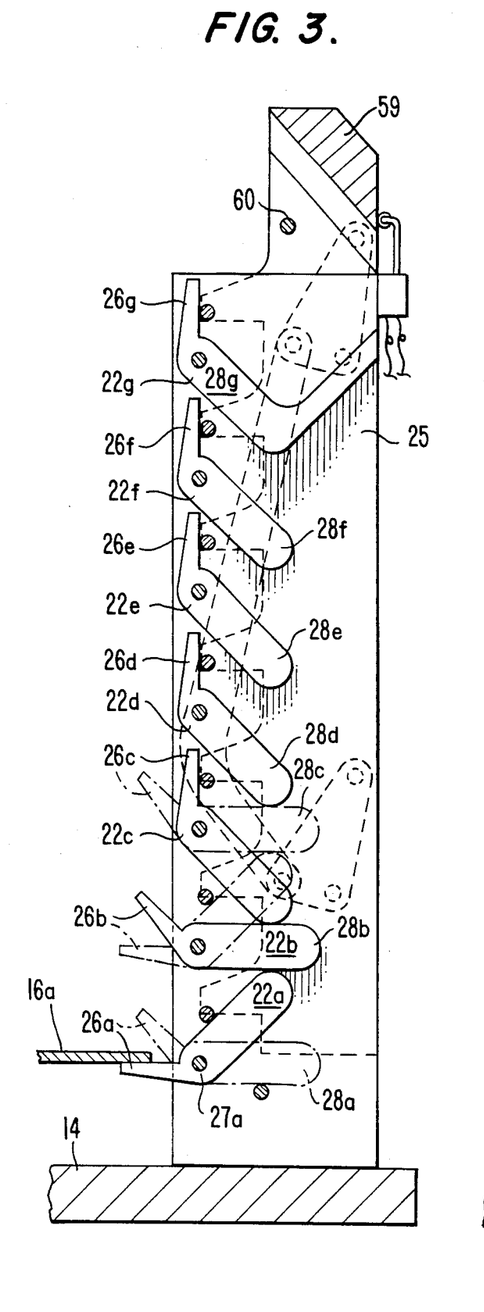
FIG. 3 is a cross-sectional view taken along line 3—3 of FIG. 2 showing a latch column having a vertically-spaced plurality of latch arms and showing the locking device in its unlocked position in phantom.
Figure 4:
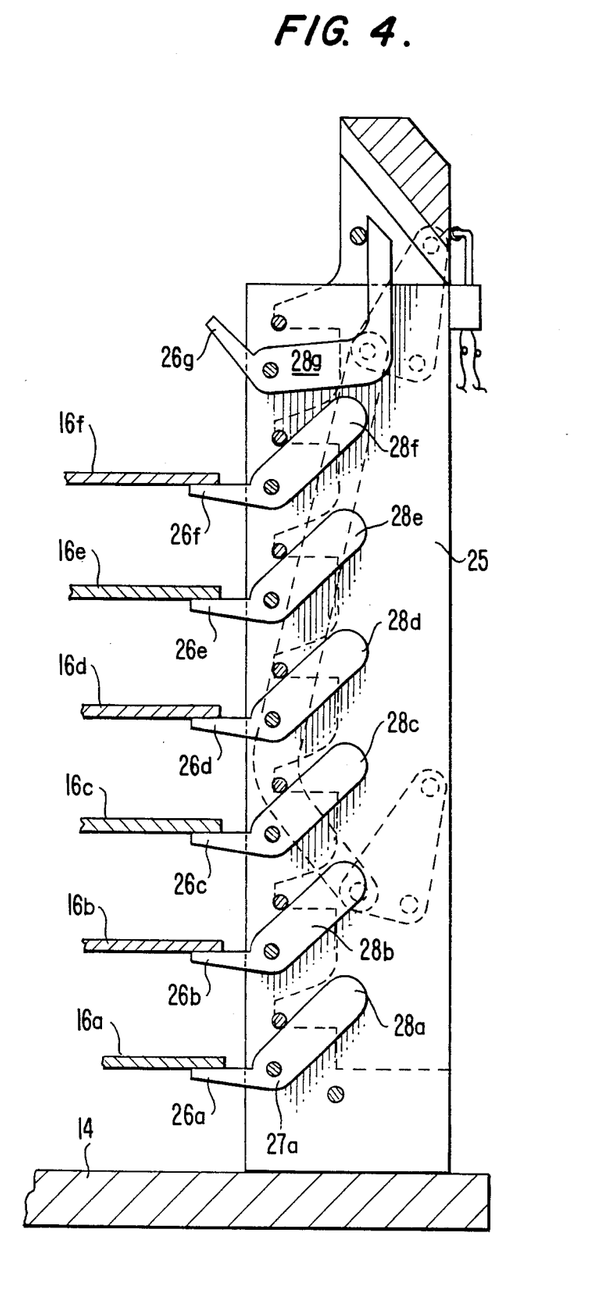
FIG. 4 is a view similar to FIG. 3 showing the racking device partially loaded with the locking mechanism in its unlocked position and wherein the locking device remains in its unlocked position.
Figure 5:
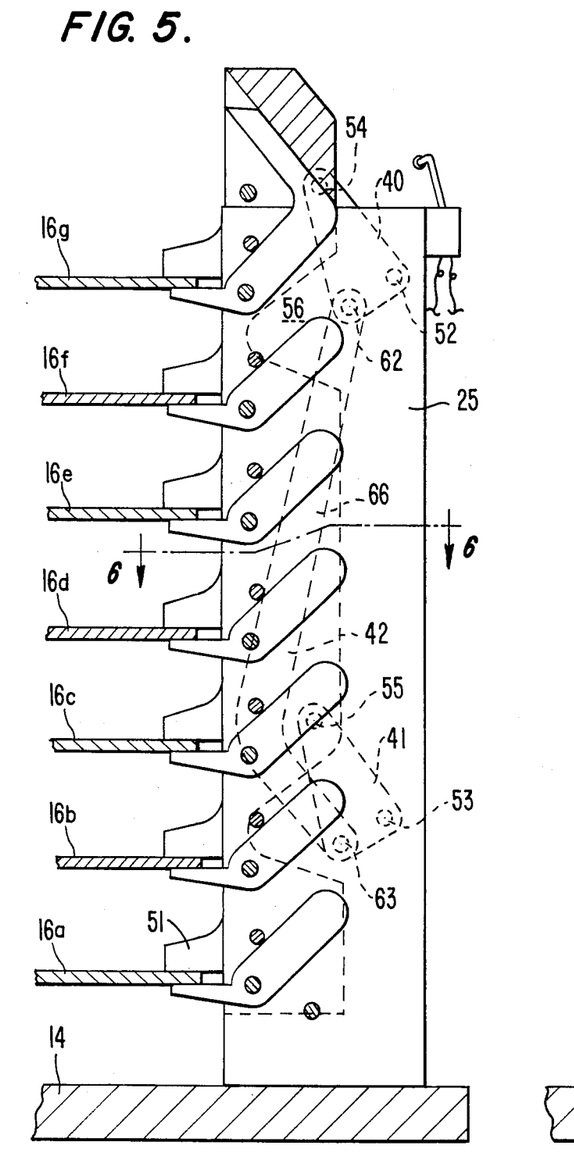
FIG. 5 is a view similar to FIGS. 3 and 4 wherein each of the latch arms is loaded with a finished component and the locking mechanism has been pivoted into its locking position so that fingers on the locking plate retain the finished parts on the receiving portions of the latch arms.

Referring particularly to FIGS. 3–6, each latch column 12 includes a plurality of latch members 22, rotatably disposed between a pair of side plates 24 and 25 forming each latch column 12. Each such latch member 22 is substantially identical in construction and includes a receiving arm 26 and a weighted arm 28, having an axis a which is angularly disposed relative to an axis b of the receiving arm 26, as best seen in FIG. 5. Each latch member 22 is respectively pivotable about its corresponding pivot pin 27 respectively located vertically along the mast forming the latch column 12. The pivot pins 27 span the side plates 24 and 25 and are of like number to the latch members 22.

As shown in FIG. 3, seven such latch members 22 are shown in their varying states of operation, sequentially shown in FIGS. 3–5. In operation, the lowermost latch member 22a is initially always positioned relative to a stop member 29 as shown in phantom in FIG. 3 so that its weighted arm 28a rests on the stop member 29 causing its receiving arm 26a to extend angularly and inwardly of the innermost surface 12s of the latch column 12. Thus, the receiving position of the latch member 26a is initially assumed, while the other latch members are in a rest position wherein their receiving arms are contained within the internal periphery of the latch column 12. Thus, the latch member 22a assumes a receiving position as its normal or initial position, while each of the remaining latch members is located as shown for the positions of the latch arms 22d–22g respectively. That is, the receiving arms 26b–26g lie generally vertically oriented and within the space defined by the side plates 24 and 25 so that finished articles may be positioned from above downwardly along the surface 12a within the latch columns 12 until a finished article 16a contacts the receiving arm 26a in its position shown in phantom outline in FIG. 3. Contact of the article 16a with the receiving arm 26a causes a pivoting of the latch arm 22a until the receiving arm 26a assumes a generally horizontal attitude, as shown in FIG. 3 in solid lines, with the article 14a resting thereon. The thus-caused pivoting of the lowermost latch arm 26a about the pivot pin 27a causes the weighted arm 28a to rise vertically until an end of the weighted arm 28a causes the lower surface of the weighted arm 28b of the next uppermost adjacent latch member 22b to be pushed upwardly to ready the latch member 26b to receive the next article.

In FIG. 3, the situation is shown wherein the lowermost latch arm 22a has been loaded so that its receiving arm 26a is generally horizontal and a finished part 16a rests thereon. At that time in the loading process, the latch arm 22b has assumed the attitude shown in solid line in FIG. 3 wherein the receiving arm 26b has assumed its angularly-oriented receiving position and its weighted arm rests within the latch column 12a in a generally horizontal position. At the same time, the next uppermost latch 22c is in the position shown by solid outline wherein its receiving arm 22c assumes a generally vertical attitude while the weighted arm lies generally downwardly and inwardly within the side plates 24 and 25.

Upon receipt of the next article 16b, the latch arm 22b is pivoted so that its receiving arm 26b assumes a horizontal attitude, causing the weighted arm 28b to frictionally slide along an outward end of the next uppermost weighted arm 28c causing the latch arm 22c to assume the ready position shown in phantom in FIG. 3. Thus, each latch arm 22 is capable of three positions: (a) a rest position, wherein the receiving arm 26 is clear of the space defined interiorly of the upwardly-extending interior surfaces 12s of each of the latch columns 12; (b) a receiving position, ready to receive articles, in which the receiving arm 26 assumes an angular attitude while the weighted arm 28 lies generally horizontal such as that shown in solid line in FIG. 3 by the latch arm 22b and wherein the receiving arm 26 lies within the space defined interiorly of the surfaces 12s of each of the latch columns; and (c) a loaded position such as that shown by the latch arm 26a wherein the receiving arm 26 lies generally horizontal and the weighted arm 28 lies in an upwardly directed attitude within the latch columns 12.

This sequence of loading continues seriatim as representively shown by FIG. 4 wherein the latch members 22a–22f are loaded with parts 16a–16f, and the latch arm 22g is in its receiving position, having been readied for action by the pivoting of the latch member 22f from its receiving position to its loaded position as shown. Thereafter, the last finished component 16g is loaded onto the device, as shown in FIG. 5 and the racking device 10 is ready for locking by the locking device 20.

Each latch member is sized and relatively weighted so that the weight of the finished component 16 pivots the latch about the pivot pin 27. Thus, the deposit of each finished part 16 will automatically move the latches into a receiving position for the next part. Thus, removal of the finished part 16g, as shown in FIG. 5, causes the latch column to assume the attitude shown in FIG. 4 automatically because of the weight of the weighted arm 28g causing the pivoting of the latch arm 22g to the receiving position as shown in FIG. 4. At this time, a finished component may be added to the device 10 to resume loading to completion, as shown in FIG. 5 or the articles may be sequentially removed from the device reaching the loading state shown in FIG. 3 wherein the removal of the part 16a causes the lowermost latch to assume its ready position wherein the weighted arm 28a contacts the pin 29.

The plates 24 and 25 may be separate members secured to the base member 14 such as by welding or may comprise the spaced, opposed, side plates of a channel member for receiving the pivot pins 27 therebetween.

The distance between the respective vertically aligned pivot pins 27 will depend upon the shape of the parts and the need for space between them stacking. Thus, once the distance between adjacent pins 27 is determined, the length of the weighted arm 28 is determined to cause the sliding contact therebetween to achieve the sequence described in FIGS. 3–5. Similarly, the distance between the lowermost pivot 27a and the base member 14 will depend upon the shape of the part and the need for clearance between the lowermost surface of the finished part 16a and the upper surface of the base member 14.

As shown in FIGS. 3–6, the receiving arm of each latch is defined by a pair of surfaces 30 and 31 which gradually merge to an end surface 32 which defines an innermost extent of the receiving arm 26. The surface 30, on which the finished part 16 rests when the device is in its loaded position may be provided with a protective covering to avoid marring a finished surface such as the painted surface of an automobile part such as a hood.

The weighted arm of each latch member 22 is defined by a pair of upper and lower generally parallel surfaces 34 and 35 terminating in an outermost generally arcuate surface 36. The width of such device, when viewed from above, made vary, and a representative width is shown in FIG. 6.

When the loading of the racking device 10 has reached the state as shown in FIG. 5, the device may be locked by the actuation of the locking device 20 to secure finished articles 16 therewithin. The locking device 20 includes an upper cam member 40 and a lower cam member 41 connected to a pivot arm 42 to cause a locking plate 50 having a plurality of locking fingers 51 to slide generally horizontally inwardly toward the space in which the parts 16 rest. The locking device 20 may be manually actuated or automatically actuated to provide its locking and unlocking functions.

Figure 6:
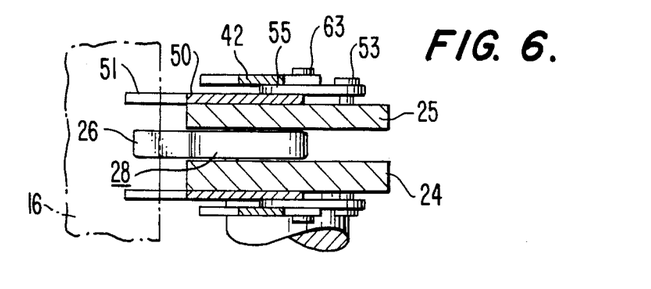
FIG. 6 is a cross-sectional view of the latch column taken along lines 6—6 of FIG. 5.

As best seen in FIG. 6, a pair of locking plates 50 are provided immediately adjacent the outer surfaces of the side plates 24 and 25. Vertically, the locking plate 50 may extend along the entire length of the column 12, or, in the alternative, may merely lock a plurality of the uppermost finished articles. The locking plate 50 is shown in phantom in FIG. 3 in its unlocked position wherein its locking fingers 51 are positioned along the sides of the plates 24 and 25 to be free from the space defined by the latch columns for receiving the finished articles 16.

When actuated to its locking position, as shown in FIG. 5, the locking plate 50 is caused by the cam members 40 and 41 in cooperation with the pivot arm 42 to move inwardly and downwardly so that a lower surface of each locking finger 51 rests on the upper surface of the finished article 16 positioned on the receiving arms 26 to secure the articles between the locking finger 51 and the receiving arm 26. The motion of the locking plate 50 is generally inwardly and downwardly along an arc defined by the distance between the pivot pins 52 and 53, securing the upper cam member and the lower cam member respectively to the exterior of the side plates 24 and 25, and the pivot pins 54 and 55 respectively securing the cam members 40, 41 to the locking plate 50. Each locking plate 50 may include a recess 56 to accommodate the positioning of the locking plate 50 relative to the pivot pins 52 and 53. Thus, in its unlocked position as shown in FIG. 3, the pivot pins 52 and 54 lie generally at an angle in the first quadrant so that pressure applied to a joining member 59 joining the opposed locking plates 50 may cause the desire actuation.

Downward movement of the locking device 20 is limited by a pin 60 (best seen in FIG. 7) joining the plates 50, which, in the locking position, contacts an uppermost surface of the latch columns.

Preferably, each of the latch columns includes such a locking device 20, but fewer locking devices than latch columns may be used in appropriate circumstances.

As best seen in FIG. 6, the upper and lower cam members 40, 41 lie outwardly from the side plates 50 and are joined by the pivot arms 42 respectively connected at pivot pins 62 and 63 so that the pivot arm lies outwardly of the cam members 40, 41. A protective housing may be provided for the locking device. Thus, the locking device 20 includes, on each side of a latch column, a locking plate 50 having extending locking fingers 51 spaced therealong, actuated from an unlocked position to a locked position by a pair of cam members 40, 41 pivotably secured at pins 52, 53 to each side plate 24, 25, the cam members 41, 42 being pivotably secured to the locking plate 50 at pins 54, 55, and the respective cam members 41, 42 being pivotably connected at pins 62, 63 to a pivot arm 42. The pivot arm 42 has an elongated portion 66 terminating in an angularly disposed portion 67 so that at rest the pivot arm also remains free from the space receiving the articles 16.

While manual operation of the locking device 20 has been described, alternatively, the device may be locked automatically by utilizing a microswitch 70 electrically actuating a power source for causing rotation by a suitable driving mechanism of the locking plates 50 in the desired locking position. The microswitch 70 senses actuation of the uppermost latch arm 22g to cause the locking plate 50 to pivot and the locking device 20 to operate after a suitable period of time to permit the loaded device to settle. For example, the switch 70 may include a normally-opened switch which is closed when loaded and which opens when desired to permit unloading of the racking device. Actuation of the microswitch can be caused to occur by the pivoting of the uppermost pivot arm 22g to open a normally-closed switch, or close a normally-opened switch to activate the locking mechanism.

Figure 7:
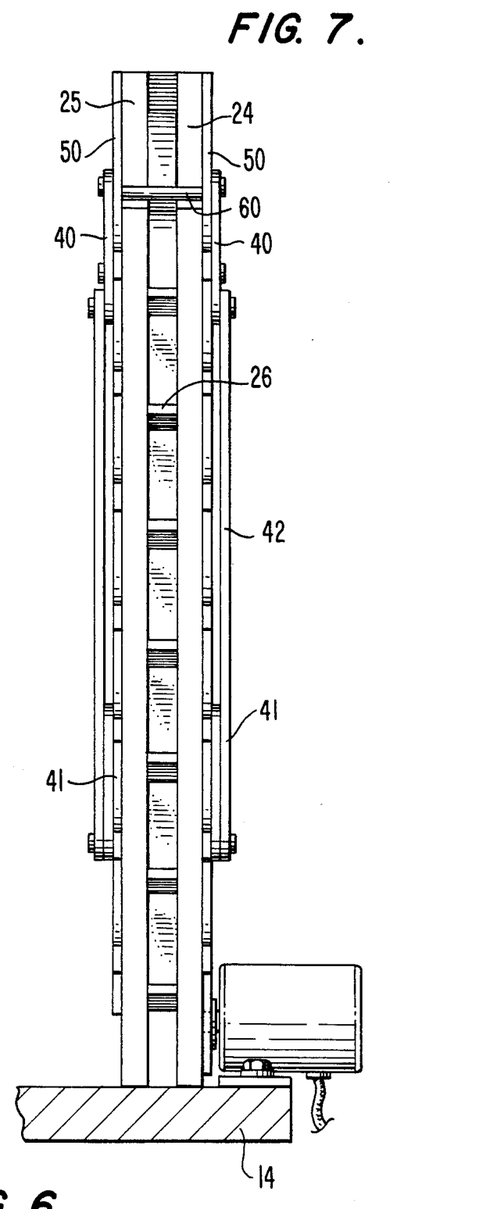
FIG. 7 is an end view of a latch column showing the locking mechanism.
Figure 8:
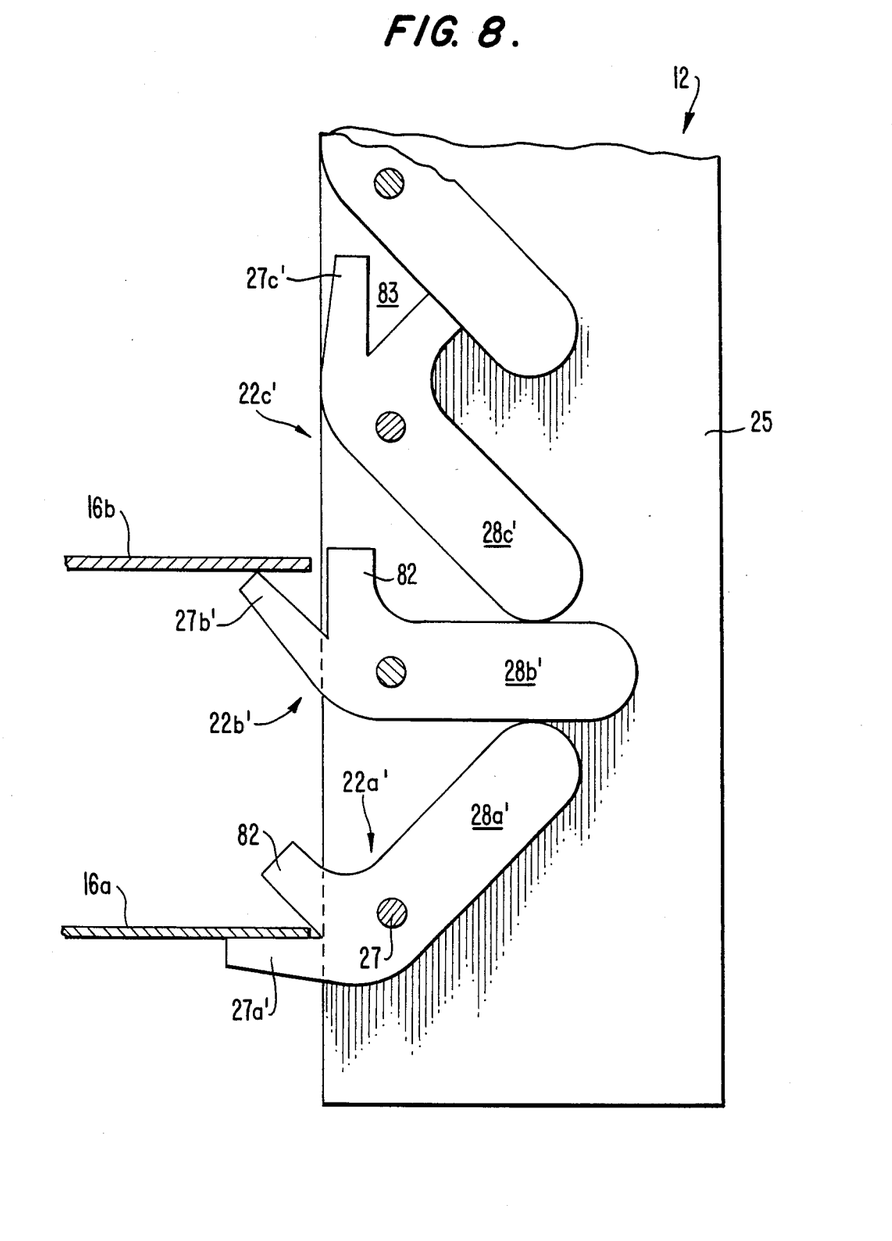
FIG. 8 is a partial view of a latch column showing an alternative embodiment of the latch arm.

FIG. 8 shows an alternative embodiment for the shape of the latch arms 22 wherein the weighted portion 28 is substantially identical to that described in connection with FIGS. 1-7. In this embodiment, however, the receiving portion 22 is formed in cooperation with a retaining arm 82 which with the receiving arm 26 defines a generally v-shaped recess 83. In operation, the latch member 22 operates substantially as previously described wherein each latch 22 is moved to its ready position by the loading of the next lowermost-adjacent latch. Thus, the latch 22a' is shown in its loaded position while the latch 22b' is shown in its ready position for receiving an article 16 thereon wherein the receiving arm 27b' extends at an angle interiorly of the space defined by the latch column 12 and the retaining arm 82b extends generally vertically and upwardly within the space defined by the side plates 24, 25. When loaded, as shown by the lowermost latch arm 22a', the received article is retained within the recess 82a, thus avoiding the need for a locking mechanism.

Such an embodiment may be used to retain the finished articles in a secured relationship without the need for the locking device 20 described in connection with FIG. 7 or incorporation therewith to secure each of the finished parts 16 on the racking device. Withdrawal of the article from the rack causes pivoting of the latch arm 22 by slight contact between an outer surface of the finished article and the inner surface of the retaining arm, in combination with the weighted arm 28.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalence of the claims are therefore intended to be embraced therein.

What is claimed is:

1. A device for stacking finished parts comprising:
a frame formed from a plurality of latch columns secured to a base member to define a space intermediate the latch columns for receiving finished articles in a spaced, stacked array;
a plurality of lever arms pivotably secured to said latch column and spaced vertically therealong, each of said lever arms having a receiving portion and an oppositely-extending weighted arm angularly disposed relative to said receiving portion, said lever arms being pivotably connected to said latch column so that each of said lever arms is capable of assuming (a) a rest position, wherein each of said receiving portion and said weighted arm are free from said space; (b) a receiving position, wherein said receiving portion is located within said space in a position ready to receive an article thereon within said space; and (c) a loaded position, an adjacent pair of said latch arms cooperating so that a loading of an article on said receiving portion of a lower latch arm causes said lower latch arm to pivot from its receiving position to its loaded position and thus to cause a pivoting of the next uppermost latch arm from its rest position to its receiving position, the weighted arms of the respective latch arms being in sliding contact;

each of said latch arms including a retaining arm located intermediate said receiving portion and said weighted arm to define with said receiving portion a recess for securing an end of said stacked article in said recess when said latch arm rotates from its receiving to its loaded position.

2. The device as set forth in claim 1, wherein each latch arm consists of a receiving portion and a weighted arm, an axis of said receiving portion being angularly disposed relative to an axis of said weighted arm, and means for receiving a pivot pin therethrough to mount said latch arm to said latch column.

3. The device as set forth in claim 1, wherein said latch column includes a pin for retaining a lowermost latch arm of said plurality of latch arms in its receiving position.

4. The device as set forth in claim 1 further including means for locking said finished articles when stacked on said device.

5. The device as set forth in claim 4 wherein said locking means include a locking plate having a plurality of extending fingers, said locking plate being movable from a unlocked position to a locking position, said unlocked position being free from interference with said space defined by said latch columns for receiving said articles, said locking position having said locking fingers in contact with said stacked articles so that an edge of said stacked articles is retained between a locking finger and a corresponding receiving portion of a receiving arm.

6. The device as set forth in claim 5, wherein said locking plate is located outside of said latch column and pivotably secured thereto.

7. The device as set forth in claim 5, wherein said locking device further includes a cam member pivotably secured to said latch column and to said locking plate so that said locking plate can be rotated from an unlocked position to its locking position.

8. The device as set forth in claim 7, wherein said plurality of cam members are located adjacent to said locking plate at a side of said locking plate opposite said latch column.

9. The device as set forth in claim 8, wherein said cam members are joined by a pivot arm.

10. The device as set forth in claim 5, further including means for sensing the loading of a predetermined latch arm and actuating said locking member from its unlocked to its locked position in response thereto.

11. In an apparatus having a plurality of arms for receiving thereon finished articles in a stacked spaced vertical array, a locking device comprising:
a locking plate having a plurality of locking fingers, said locking plate normally assuming an unlocked position free from contact with said stacked array, and movable so that said locking fingers extend horizontally and vertically downwardly to retain an edge of said finished article between said locking finger and a corresponding one said receiving arms.

12. The device as set forth in claim 11, wherein said locking device further includes a plurality of cam members pivotably secured to a latch column, said cam members being respectively pivotably secured to said latch column, said locking plate pivoting from an unlocked position to its locking position by said cam members.

13. The device as set forth in claim 12, further including a pivot arm connecting said cam members.

14. A device for stacking finished parts comprising:
a frame formed from a plurality of latch columns secured to a base member to define a space intermediate the latch columns for receiving finished articles in a spaced, stacked array;
a plurality of lever arms pivotably secured to said latch column and spaced vertically therealong, each of said lever arms having a receiving portion and an oppositely-extending weighted arm angularly disposed relative to said receiving portion, said lever arms being pivotably connected to said latch column so that each of said lever arms is capable of assuming (a) a rest position, wherein each of said receiving portion and said weighted arm are free from said space; (b) a receiving position, wherein said receiving portion is located within said space in a position ready to receive an article thereon within said space; and (c) a loaded position, an adjacent pair of said latch arms cooperating so lower latch arm causes said lower latch arm to pivot from its receiving position to its loaded position and thus to cause a pivoting of the next uppermost latch arm from its rest position to its receiving position, the weighted arms of the respective latch arms being in sliding contact;
and further including a locking means which includes a locking plate having a plurality of extending fingers, said locking plate being movable from a unlocked position to a locking position, said unlocked position being free from interference with said space defined by said latch columns for receiving said articles, said locking position having said locking fingers in contact with said stacked articles so that an edge of said stacked articles is retained between a locking finger and a corresponding receiving portion of a receiving arm.

15. The device as set forth in claim 14, wherein said locking plate is located outside of said latch column and pivotably secured thereto.

16. The device as set forth in claim 14, wherein said locking device further includes a cam member pivotably secured to said latch column and to said locking plate so that said locking plate can be rotated from an unlocked position to its locking position.

17. The device as set forth in claim 16, wherein said plurality of cam members are located adjacent to said locking plate at a side of said locking plate opposite said latch column.

18. The device as set forth in claim 17, wherein said cam members are joined by a pivot arm.

19. The device as set forth in claim 14, further including means for sensing the loading of a predetermined latch arm and actuating said locking member from its unlocked to its locked position in response thereto.

* * * * *

UNITED STATES PATENT AND TRADEMARK OFFICE
CERTIFICATE OF CORRECTION

PATENT NO. : 4,712,691

DATED : December 15, 1987

INVENTOR(S) : Hans Grill and Gerhard Tappen

It is certified that error appears in the above-identified patent and that said Letters Patent is hereby corrected as shown below:

On the Title page insert:

--[73] Assignee: L. Schuler GmbH --

Signed and Sealed this

Seventh Day of February, 1989

Attest:

DONALD J. QUIGG

*Attesting Officer*     *Commissioner of Patents and Trademarks*